United States Patent
Yoshizaki

(10) Patent No.: US 9,195,013 B2
(45) Date of Patent: Nov. 24, 2015

(54) OPTICAL CONNECTOR PLUG

(71) Applicant: HONDA TSUSHIN KOGYO CO., LTD., Tokyo (JP)

(72) Inventor: Tsuyoshi Yoshizaki, Tokyo (JP)

(73) Assignee: HONDA TSUSHIN KOGYO CO., LTD., Tokyo (JP)

(*) Notice: Subject to any disclaimer, the term of this patent is extended or adjusted under 35 U.S.C. 154(b) by 0 days.

(21) Appl. No.: 14/333,777

(22) Filed: Jul. 17, 2014

(65) Prior Publication Data

US 2015/0049989 A1 Feb. 19, 2015

(30) Foreign Application Priority Data

Aug. 19, 2013 (JP) .................................. 2013-169543

(51) Int. Cl.
*G02B 6/36* (2006.01)
*G02B 6/38* (2006.01)

(52) U.S. Cl.
CPC ................ *G02B 6/3893* (2013.01); *G02B 6/36* (2013.01); *G02B 6/3825* (2013.01); *G02B 6/3869* (2013.01); *G02B 6/3831* (2013.01); *G02B 6/3849* (2013.01)

(58) Field of Classification Search
CPC .... G02B 6/381; G02B 6/3833; G02B 6/3837; G02B 6/3845; G02B 6/3851; G02B 6/3869; G02B 6/3873; G02B 6/3874; G02B 6/3881; G02B 6/3882; G02B 6/3895; G02B 6/3893; G02B 6/3825; G02B 6/3821; G02B 6/3831; G02B 6/36; G02B 6/3897
USPC .......... 385/55, 60, 62, 65, 70, 72, 66, 78, 83, 385/84, 89, 92, 139
See application file for complete search history.

(56) References Cited

U.S. PATENT DOCUMENTS

2011/0211799 A1* 9/2011 Conner et al. ................. 385/135
2012/0057831 A1* 3/2012 Taira et al. ...................... 385/78

FOREIGN PATENT DOCUMENTS

JP 2010-230862 10/2010
JP 2011-013606 1/2011

OTHER PUBLICATIONS

Extended European Search Report issued Dec. 23, 2014 in corresponding European Patent Application No. 14177432.3.

* cited by examiner

*Primary Examiner* — Kaveh Kianni
*Assistant Examiner* — Hung Lam
(74) *Attorney, Agent, or Firm* — Wenderoth, Lind & Ponack, L.L.P.

(57) ABSTRACT

Disclosed an optical connector plug to be fitted into a LC type adapter having a wide width opening and a narrow width opening. The optical connector plug includes a square cylindrical front housing; a plug frame for retaining a ferrule and slidable in the front housing, a locking housing connected to the plug frame and fitted in and locked with the LC type adapter. The guide portion on an upper part of the front housing has side wall surfaces coming in sliding contact with the opening having a narrow width at the upper part of the adapter and locking projections on the sidewall surfaces. The locking projections abut against an edge portion of an opening of the adapter when the locking housing is fitted into the adapter, so that the front housing is moved rearward, and a distal end portion of the ferrule projects outward from the opening.

2 Claims, 10 Drawing Sheets

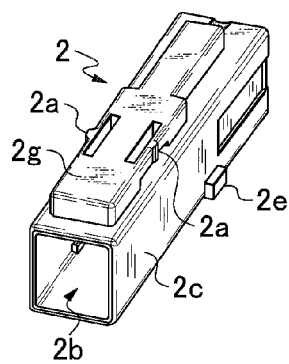
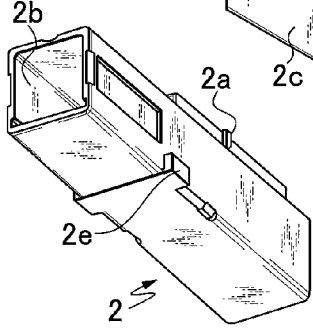
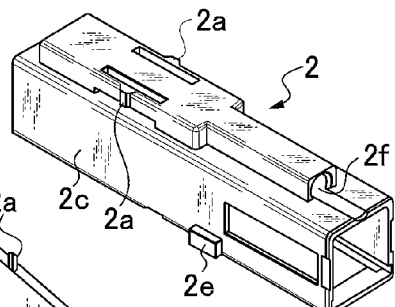
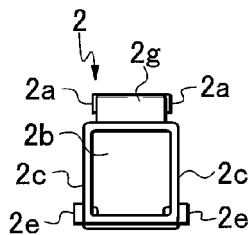
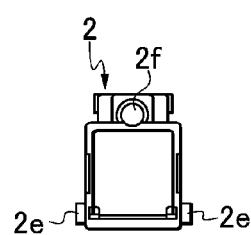
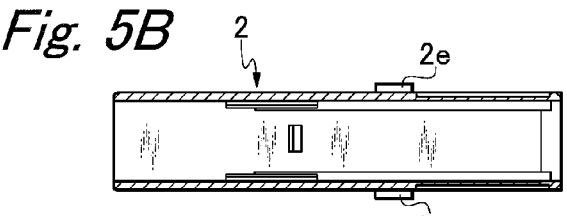
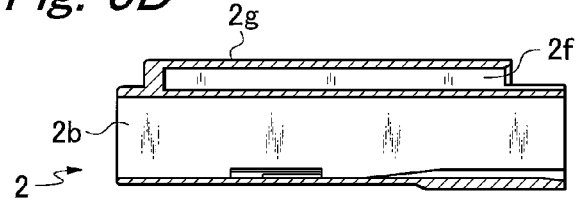

OPTICAL CONNECTOR PLUG

BACKGROUND OF THE INVENTION

1. Field of the Invention

The present invention relates to an optical connector plug used for a connecting end of an optical fiber cable.

2. Prior Art

In the prior art, as an LC type plug to be mainly fitted into an adapter having an LC type opening as an optical connector plug, an LC type plug including: a cylindrical plug frame having a ferrule and a resilient member configured to bias the ferrule toward the front in the interior thereof; a cylindrical movable front housing surrounding the plug frame so as to be in sliding contact with an outside thereof; a light-shielding plate having a curved shape, fixed at one end portion thereof to an inner wall of the front housing, and configured to block light at a position in front of the ferrule; and the locking housing configured to be fitted from the rear of the plug frame is known as disclosed in JP-A-2011-13606.

With the LC type plug, the light-shielding plate blocks a laser from the ferrule to protect eyes or the like in a non-connected state with respect to the LC type adapter, and the light-shielding plate is extended from the curved shape to the straight shape by the front housing and the ferrule projects from an opening end portion of the front housing which is moved toward the rear in the connected state, so that the ferrule on the plug side and a ferrule of the adapter on the connection counterpart are connected.

However, as illustrated in FIGS. 9A and 9B, in an optical connector plug 15 of the prior art, the light-shielding plate is extended and opened to the straight shape by a rearward movement of a front housing 151, and the front housing 151 comes into contact with an opening of the LC type adapter of the connection counterpart and is forced to retract in a direction opposite to a direction of insertion.

A locking projection 153 is formed on a sidewall surface of the front housing 151 so as to come into contact with the opening of the LC type adapter and to be pushed rearward. However, a height of the locking projection needs to be set so as to match the shapes of the openings 12 and 14 of all the existing LC type adapters 11 and 13 as illustrated in FIGS. 10A to 10D, and FIGS. 11A to 11D, so that adequate setting conforming to the condition is difficult.

As illustrated in FIG. 11A to FIG. 11D, a clearance "c" for forming the locking projection is required, so that there are adapters having a large width in part of the opening. Therefore, there is a problem that an insertion and pulling force required for the LC type plug varies depending on the difference in shape of the opening of the adapter.

In addition, in order to provide the locking projection 153 formed on a sidewall of the front housing with a spring property when causing the same to retract inward at the time of fitting, a slit hole 152 is required. With the presence of this hole, light leakage to an outside is generated, so that lowering of a shielding property and lowering of dust-proof property are subjects to be challenged. The optical connector plug of the invention is proposed for solving the above-described problems.

SUMMARY OF THE INVENTION

In order to solve the above described problem, an optical connector plug of the invention is configured to be fitted into a LC type adapter having a wide width opening at a lower part thereof and a narrow width opening at an upper part thereof, and includes: a square cylindrical front housing provided with a guide portion in which a spring is accommodated on an upper part thereof; a plug frame configured to retain a ferrule and is slidable in the front housing, a locking housing fixedly and integrally connected to the plug frame and configured to be fitted into and be locked with the LC type adapter; and the guide portion on the upper part of the front housing having a side wall surface that comes in sliding contact with the narrow width opening at the upper part of the adapter and a locking projection on the side wall surface, wherein the locking projection of the guide portion abuts against an edge portion of the opening of the adapter to move the front housing rearward when the locking housing is fitted into the adapter, so that a distal end portion of the ferrule projects outward from the opening of the front housing.

Preferably, the side wall of the front housing abutting against the wide width opening at the lower part of the adapter is not provided with the locking projection that abuts against the edge portion of the opening of the adapter, and the side wall has no opening so that light is prevented from leaking out from the interior of the front housing.

According to the optical connector plug of the invention, since the locking projection which may cause a rearward movement of the front housing is transferred to a position that is not influenced by the difference in shape of the opening of the adapter as a fitting counterpart, setting of dimensions of the projection is facilitated. Also, since the side wall surface of the front housing is made not to transmit light, superior effects that occurrence of light leakage is prevented and dust-proof property is improved are achieved.

BRIEF DESCRIPTION OF THE DRAWINGS

FIGS. 4A, 4B, and 4C are a perspective view viewed from the front, a perspective view viewed from below, and a perspective view viewed from the rear of the front housing of the optical connector plug, respectively;

FIGS. 5A, 5B, 5C, and 5D are a front view, a cross-sectional plan view, a rear view, and a cross-sectional side view of the front housing of the optical connector plug, respectively;

DETAILED DESCRIPTION OF THE PREFERRED EMBODIMENTS

Figure 1A:
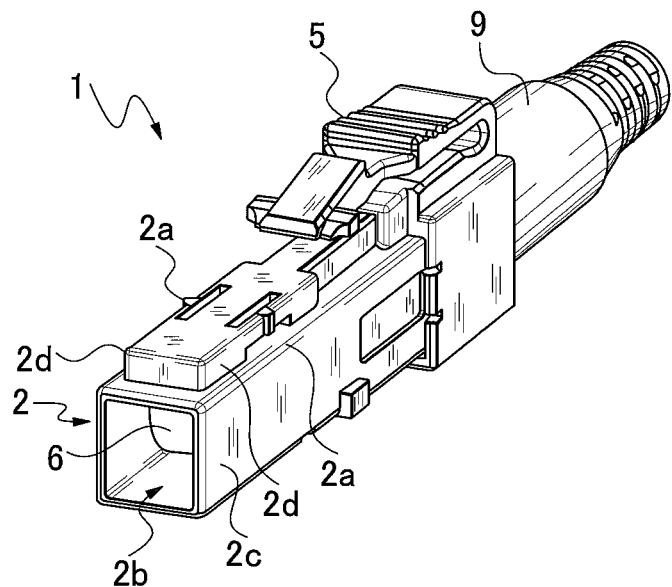
FIG. 1A is a perspective view of an optical connector plug of the invention illustrating a non-connected state.
Figure 1B:
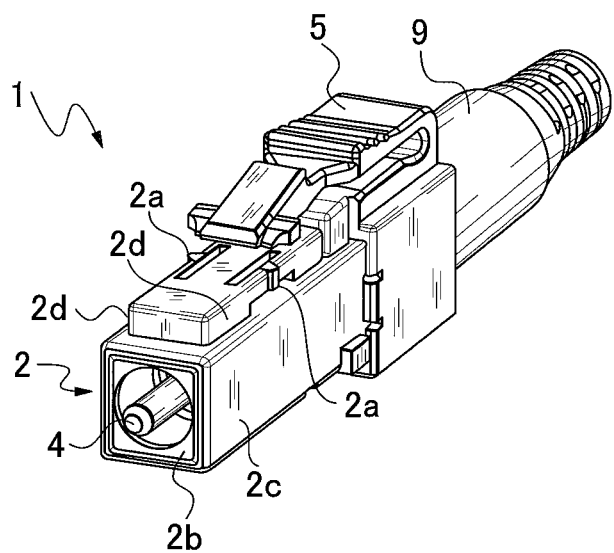
FIG. 1B is a perspective view of a light-shielding wall opened state in the connected state thereof.

An optical connector plug 1 of the invention includes locking projections 2a to lock a front housing 2 moving rearward by an adapter 11 or 13 (see FIGS. 10A to 10D, FIGS. 11A to 11D) as the fitting counterpart so as to abut against a narrow width opening 12a, or 14a of an opening 12, or 14 of the adapter 11, or 13 as illustrated in FIG. 1A, or 1B.

EXAMPLE 1

An optical connector plug 1 of the invention is an LC type plug such as an LC type plug with a shutter, which is to be fitted into an adapter having an LC type opening or to optical products or the like. The optical connector plug 1 is configured to be fitted into the LC type adapter 11, or 13 to be fixed to a panel or the like illustrated in FIGS. 10A to 10D, or FIGS. 11A to 11D, and configured in such a manner that the locking projections 2a of the cylindrical front housing 2 illustrated in FIG. 1A abuts against edge portions of the opening 12, or 14 of the LC type adapter 11, or 13 at the time of fitting, so that the cylindrical front housing 2 which is provided integrally with the locking projections 2a on an outer peripheral portion thereof and is movable in the fore-and-aft direction is moved rearward.

Accordingly, as illustrated in FIG. 1B and FIGS. 3A to 3F, a distal end portion of a ferrule 4 included in a plug frame 3 that supports the front housing 2 inside so as to be movable projects outward from an opening 2b of the front housing 2.

Hereinafter, configurations of the respective components will be described with a LC type plug with a shutter as a representative of the optical connector plug 1. The front housing 2 is a square cylindrical synthetic resin housing as a whole as illustrated in FIGS. 4A to 4C and FIGS. 5A to 5D, and positioning projections 2e which serve as a positioning member for the rearward movement at the time of fitting are provided on lower parts of side walls 2c.

A guide portion 2g configured to be fitted in and guided by the narrow width openings 12a, or 14a of the openings 12, or 14 of the LC type adapters 11, or 13 (see FIGS. 10A to 10D, FIG. 11A to 11D) is provided on an upper part of the front housing 2, and a space 2f in which a spring 8 is stored is formed in the interior thereof.

In addition, the locking projections 2a, which are configured to engage the LC type adapter 11, or 13 of the fitting counterpart (see FIGS. 10A to 10D, FIGS. 11A to 11D) for being moved rearward, are provided in a substantially center portion of the guide portion 2g in the fore-and-aft direction.

The sidewalls 2c are provided neither with projections nor the openings that have been required for providing a spring property, and the sidewalls do not transmit light. Consequently, light leakage does not occur due to the space in the interior of the front housing 2, and the dust-proof property is improved.

Figure 2A:
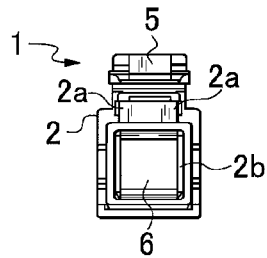
FIGS. 2A, 2B, 2C, 2D, 2E and 2F are a front view, a plan view, a side view, a rear view, a bottom view, and a cross-sectional side view of the optical connector plug in the non-connected state, respectively.
Figure 2D:
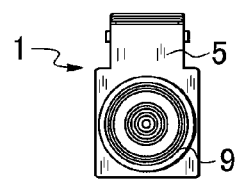
Figure 2B:
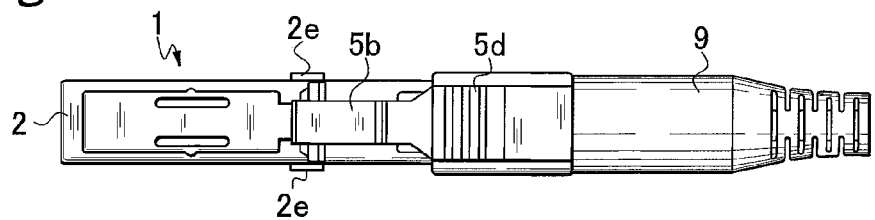
Figure 2C:
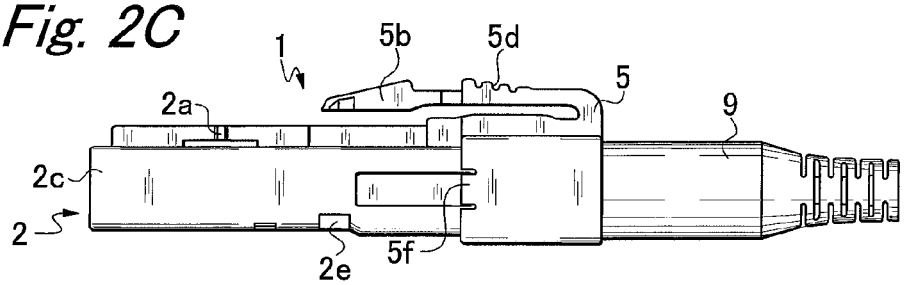
Figure 2E:
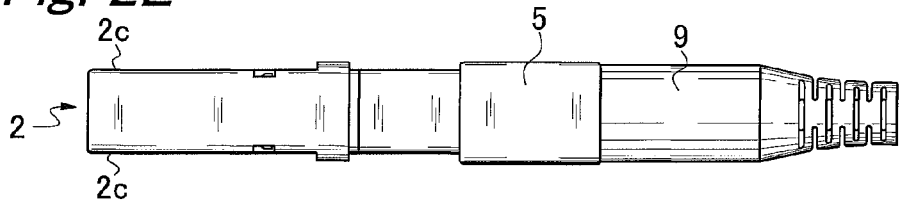
Figure 2F:
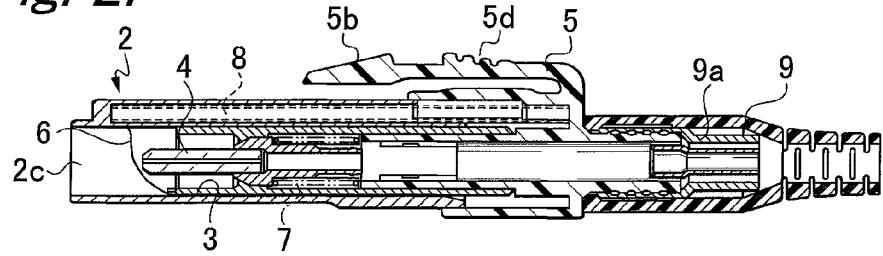

The plug frame 3 is a square cylindrical synthetic resin frame as a whole as illustrated in FIGS. 6A to 6F, and an engaging portion 3a is formed as a partitioning wall for allowing the supporting portion of the ferrule 4 to be abutted therewith and supporting in an internal space of the cylindrical body so as not to be disconnected as illustrated in FIG. 2F.

The rear sidewalls are provided with locking holes 3b configured to lock an engaging lock strip 5a of a locking housing 5 to be integrally combined with the plug frame 3 are formed so as to penetrate to the interior of the cylindrical body.

The locking housing 5 illustrated in FIGS. 7A to 7E is configured to be fitted into the LC type adapters 11, or 13 as the fitting counterparts and connect and lock the optical connector plug 1.

Figure 7A:
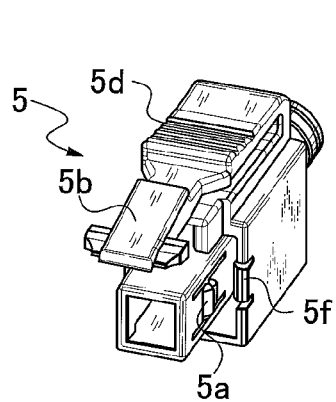
FIGS. 7A, 7B, 7C, 7D, and 7E are a perspective view viewed from the front, a perspective view viewed from the rear, a front view, a rear view, and a cross-sectional side view of a locking housing of the optical connector plug, respectively.

As illustrated in FIG. 7A, a cylindrical body of the locking housing 5 is provided with lock strips 5a to be engaged with the engaging holes 3b of the plug frame 3 on a side wall on the front side. Accordingly, the plug frame 3 is fixedly connected to the locking housing 5, and the lock strips 5a retain the plug frame 3 so as not to be disconnected toward the front.

Figure 7B:
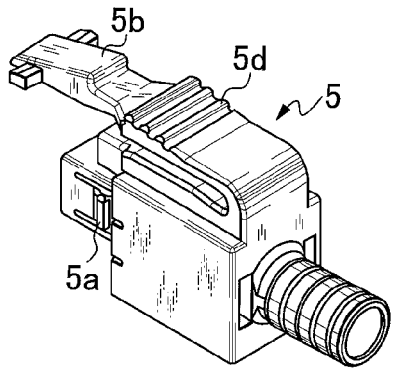
Figure 7C:
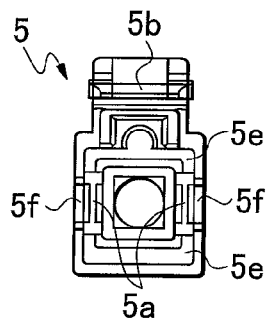
Figure 7D:
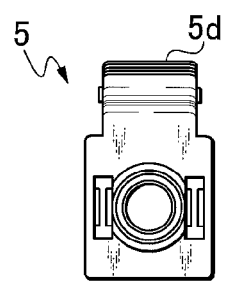
Figure 7E:
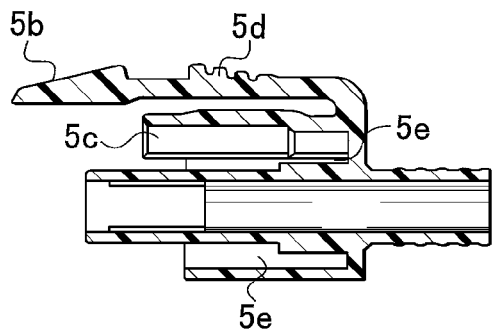

As illustrated in FIGS. 7A, 7B, and 7E, a locking strip 5b configured to engage the engaging hole of the LC type adapter as the fitting counterpart is provided on an upper part of the locking housing 5, and a lug portion 5d is formed on the base thereof. The lug portion 5d is a resilient strip, and is configured to be pressed downward to release the engagement of the locking strip 5b.

Figure 3A:
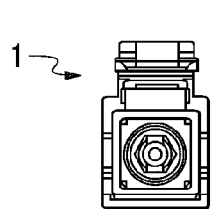
FIGS. 3A, 3B, 3C, 3D, 3E, and 3F are a front view, a plan view, a side view, a rear view, a bottom view, and a cross-sectional side view of the optical connector plug in the connected state, respectively.
Figure 3D:
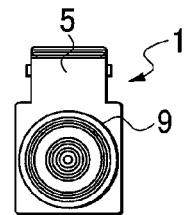
Figure 3B:
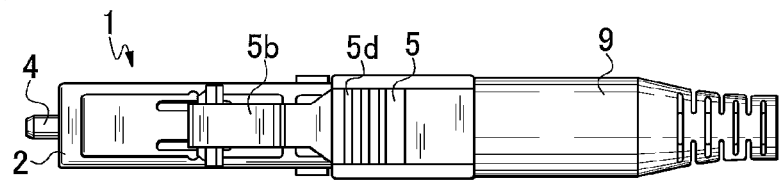
Figure 3C:
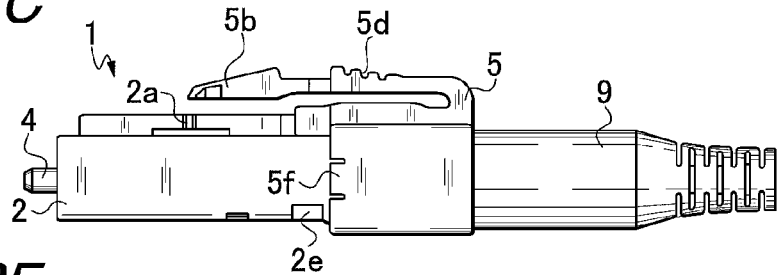
Figure 3E:
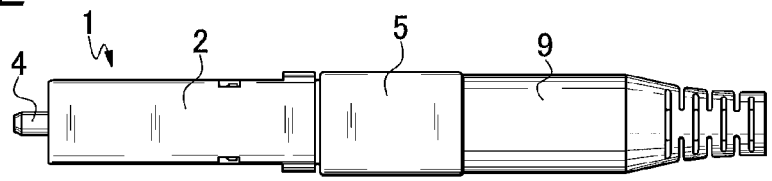
Figure 3F:
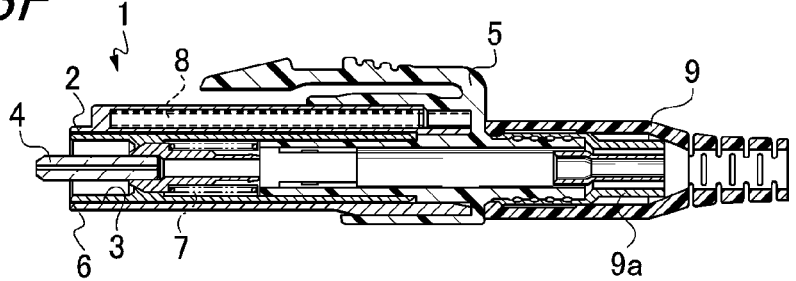
Figure 6A:
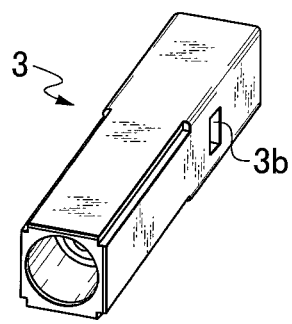
FIGS. 6A, 6B, 6C, 6D, 6E, and 6F are a perspective view viewed from the front, a perspective view viewed from the rear, a cross-sectional side view, a front view, a rear view, and a cross-sectional bottom view of a plug frame of the optical connector plug, respectively.
Figure 6B:
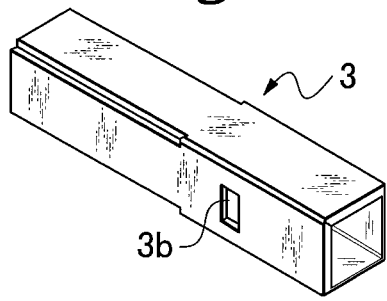
Figure 6C:
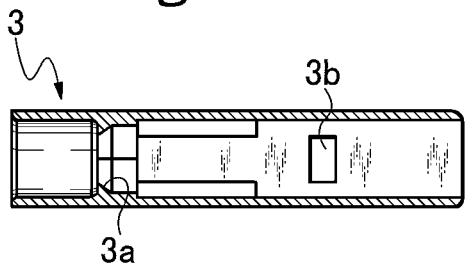
Figure 6D:
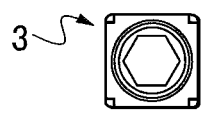
Figure 6E:
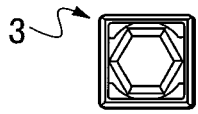
Figure 6F:
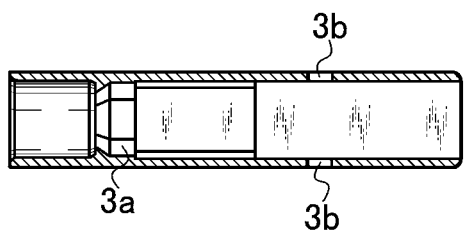

The cylindrical body in a center portion of the locking housing 5 is provided with a spring storage hole 5c on an upper part thereof as illustrated in FIG. 7E. In addition, a storage hole 5e for storing the front housing 2 is provided in the periphery of the lower portion thereof. Formed at front end portions on both sidewalls of the cylindrical body of the center portion locking strips 5f, which act as a retaining member of the front housing 2 moving in the fore-and-aft direction for preventing the front housing 2 from being disconnected toward the front as illustrated in FIGS. 2C, 3C, and 7A.

Figure 8A:
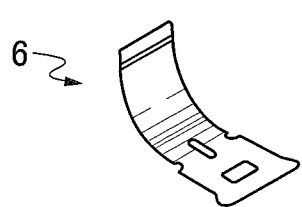
FIGS. 8A, 8B, and 8C are a perspective view, a front view, and a side view of a shutter of the optical connector plug.
Figure 8B:
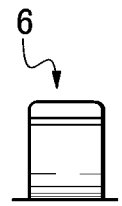
Figure 8C:
Figure 8D:
FIGS. 8D and 8E are side views illustrating two springs in the same optical connector plug respectively.
Figure 8E:
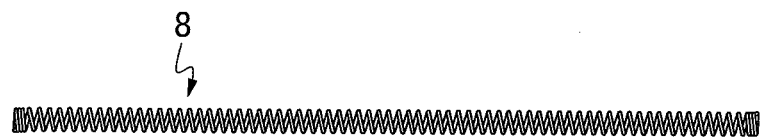
Figure 8F:
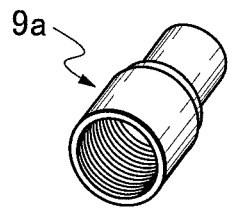
FIG. 8F is a perspective view illustrating a swage ring of the optical connector plug.
Figure 9A:
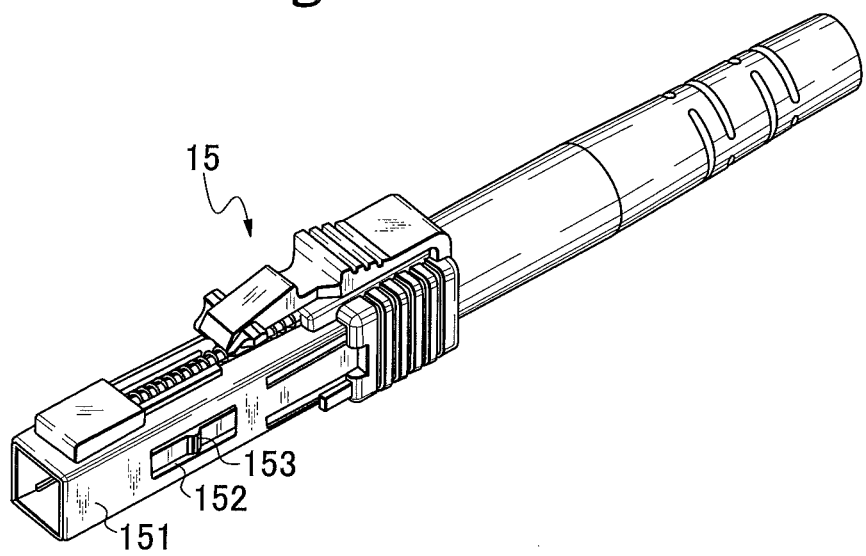
FIG. 9A is a perspective view illustrating the optical connector plug according to the prior art in the non-connected state.
Figure 9B:
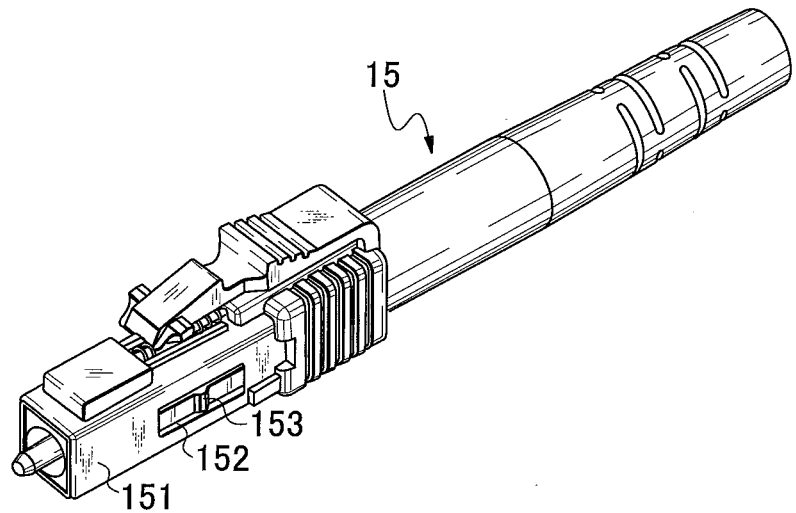
FIG. 9B is a perspective view illustrating the light connector plug in the connected state.
Figure 10A:
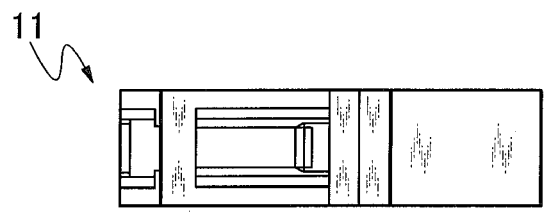
FIGS. 10A, 10B, 10C, and 10D are a plan view, a front view, a side view partly in cross section, and a rear view of the shape of an opening portion of an LC type adapter provided with locking strips for fixing the panel on a top and a bottom.
Figure 10B:
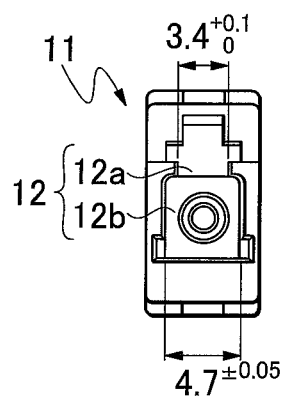
Figure 10D:
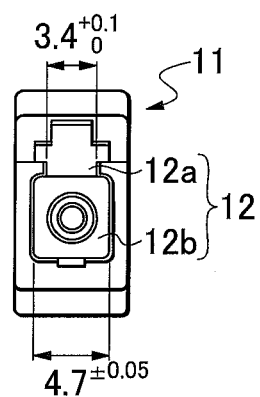
Figure 10C:
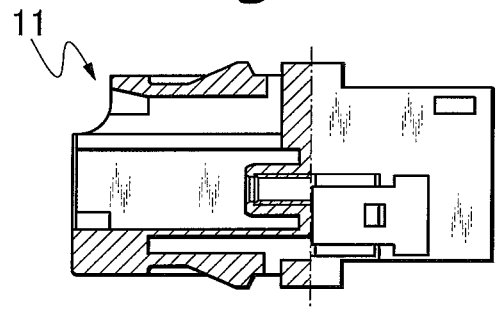
Figure 11A:
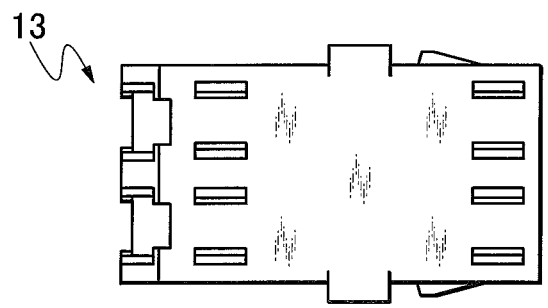
FIGS. 11A, 11B, 11C, and 11D are a plan view, a front view, a side view partly in cross section, and a rear view of the shape of an opening portion of an LC type adapter provided with locking strips for fixing the panel on the left and the right, respectively.
Figure 11B:
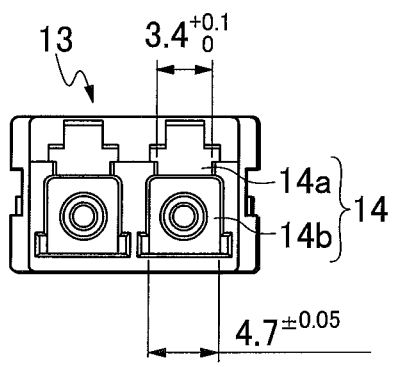
Figure 11D:
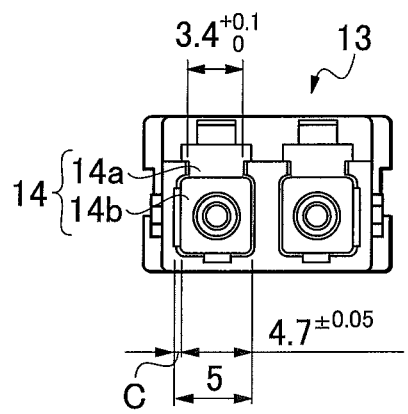
Figure 11C:
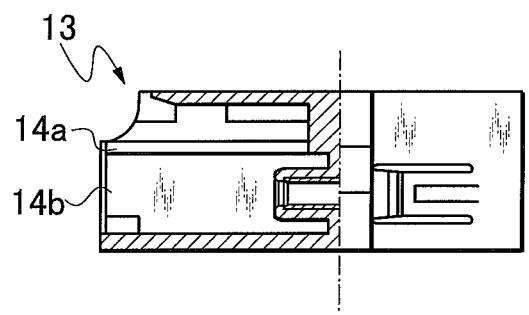

A shutter 6 illustrated in FIGS. 8A to 8C is mounted on an opening 2b of the front housing 2 so as to be openable and closable, and is opened and closed in association with the movement of the ferrule 4 (see FIGS. 2A and 2F). A spring 7 illustrated in FIG. 8D is stored in the plug frame 3, and biases the ferrule 4 toward the front (See FIG. 2F). A spring 8 illustrated in FIG. 8E is stored in a space 2f on an upper part of the front housing 2 from the rear, and biases the front housing 2 toward the front (see FIG. 3F and FIG. 4C). A swage ring 9a illustrated in FIG. 8F is used for mounting the locking housing 5 at an end portion of an optical fiber cable.

In the optical connector plug 1 formed in this manner, positions where the locking projections 2a of the front housing 2 are to be provided are side wall surfaces 2d that come into sliding contact with the narrow width openings 12a, or 14a of the LC type adapters 11, or 13 provided on the upper portions of the front housing 2 so as to abut against the narrow width openings 12a, or 14a on the upper part of the openings 12, or 14 of the LC type adapters 11, or 13 as the fitting counterpart.

The side walls 2c of the front housing 2 abutting against the wide width openings 12b, 14b at the lower parts of openings 12, or 14 of the LC type adapters 11, 13 as the fitting counterpart are not provided with the locking projections that cause the front housing 2 to move rearward at the time of fitting, and are formed as sidewalls that do not transmit light having no opening to avoid light from leaking from the interior of the front housing 2 toward the outside.

In this configuration, the front housing 2 is moved surely rearward by the openings 12a, or 14a having a narrow width (3.4 mm) of the adapter 11, or 13 as the fitting counterpart, and the shapes of the openings are not changed, so that setting of the locking projections 2a is easy. Furthermore, since the height of the locking projections 2a does not change, an insertion and puling force does not vary.

INDUSTRIAL APPLICABILITY

The optical connector plug of the invention may be applied to optical products (optical transceiver or the like) having the existing LC type adapter and the LC type opening shape.

What is claimed is:

1. An optical connector plug configured to be fitted into a LC type adapter having an opening including a wide width opening at a lower part thereof and a narrow width opening at an upper part thereof, the optical connector plug comprising:
    a front housing having a hollow quadratic shape, the front housing having a guide portion which is formed at an upper part of the front housing, the guide portion accommodating a spring;
    a plug frame configured to retain a ferrule and that is slidable in the front housing; and
    a locking housing fixedly and integrally connected to the plug frame and configured to be fitted into and locked with the LC type adapter, wherein
    the guide portion has side wall surfaces that come in sliding contact with the narrow width opening at the upper part of the LC type adapter and a locking projection formed on each of the side wall surfaces,
    each of the locking projections of the guide portion is configured to abut against an edge portion of the opening of the LC type adapter to move the front housing rearward when the locking housing is fitted into the LC type adapter, so that a distal end portion of the ferrule projects outward from an opening of the front housing, and
    the front housing has a side wall which is configured to abut against the wide width opening at the lower part of the LC type adapter, the side wall of the front housing not being provided with any of the locking projections that abut against the edge portion of the opening of the LC type adapter, and the side wall of the front housing having no opening so that light is prevented from leaking out from an interior of the front housing.

2. The optical connector plug according to claim 1, wherein the guide portion is narrower than a main body of the front housing in a width direction.

* * * * *